Sept. 3, 1957  J. H. VEALE  2,805,174
METHOD OF IMPREGNATION OF REFRACTORY BODIES
WITH PHOSPHORIC ACID
Filed April 7, 1953

Inventor
John H. Veale
Attys.

United States Patent Office 2,805,174
Patented Sept. 3, 1957

2,805,174

METHOD OF IMPREGNATION OF REFRACTORY BODIES WITH PHOSPHORIC ACID

John H. Veale, Joliet, Ill., assignor to The Illinois Clay Products Company, Joliet, Ill., a corporation of Illinois Application April 7, 1953, Serial No. 347,365

3 Claims. (Cl. 117—65)

The invention relates to refractories and method of producing the same. More particularly the invention relates to refractory bodies such as refractory bricks (both fired and unfired) and to a method of improving their density while substantially maintaining the original resistance to thermal shock.

It is well known that the breaking strengh of a refractory and the ability of a refractory to withstand the erosion, corrosion or abrasion of metal or slag is a function of its porosity. In the past, however, it has not been possible to produce a brick with very low porosity without sacrificing its resistance to thermal shock. In certain installations where there is no thermal shock, such as in a glass tank, refractories with practically no porosity have been very successful. To produce a refractory brick with a very low porosity it is necessary to burn the brick at a high temperature near its sintering point or to electrically fuse the material and cast it into the desired shape in the molten state.

In the first method the brick necessarily show a high burning shrinkage which produces warpage and considerable quantity of second quality ware. The second method is quite expensive.

Refractory bodies produced by either method have poor resistance to thermal shock, chiefly due to high glass content.

An object of this invention is to provide a method of lowering the porosity or increasing the density of a refractory body without substantially decreasing its resistance to thermal shock.

Another object is to provide a refractory body having improved breaking strength and ability to withstand erosion and corrosion, while also having high resistance to spalling.

Other objects and advantages of the invention will become apparent as the following detailed description progresses, reference being had to the accompanying drawings wherein—

Figure 1:
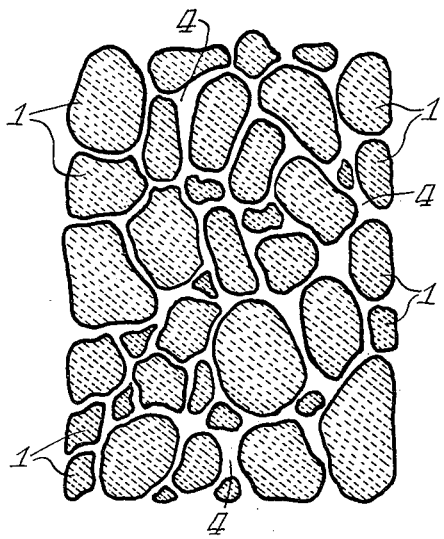
Fig. 1 shows an enlarged diagrammatic cross-section of a portion of a refractory body.
Figure 2:
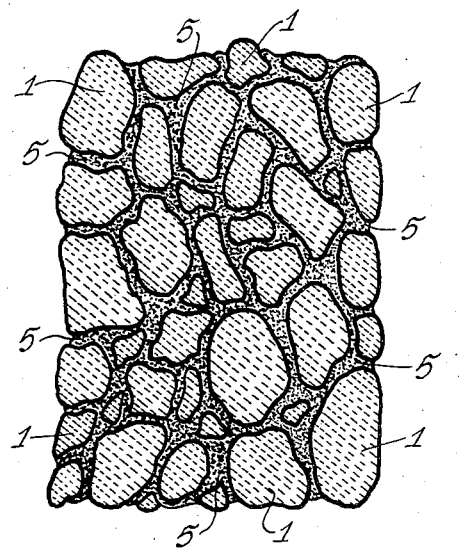
Fig. 2 shows an enlarged diagrammatic cross-section of a portion of a refractory body treated in accordance with this invention.
Figure 3:
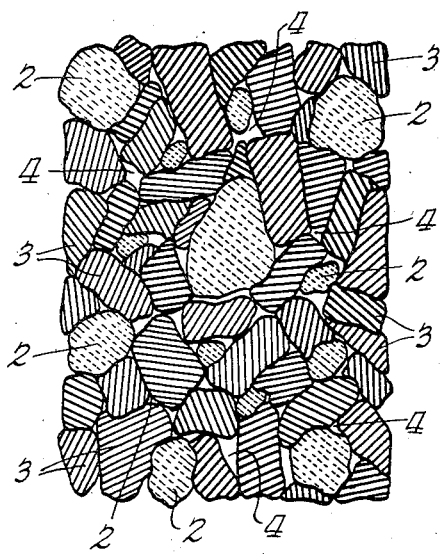
Fig. 3 shows an enlarged diagrammatic cross-section of a portion of a clay fire-brick.
Figure 4:
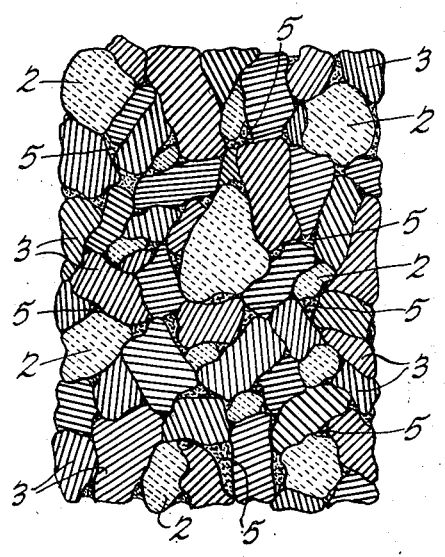
Fig. 4 shows an enlarged diagrammatic cross-section of a portion of a clay fire-brick treated in accordance with this invention.

Referring to Figs. 1 and 2, the reference character 1 refers to refractory grains which may be silica, carbon or the like. In Figs. 3 and 4 there are shown quartz grains 2 and clay particles 3. In Figs. 1 and 3 the interstitial spaces between the grains are designated by 4, and in Figs. 2 and 4, showing the treated product, the spaces are filled with a phosphoric acid and/or phosphate reaction product 5.

In accordance with this invention, a refractory body whose pores are largely of the open or interconnected cell type is treated with a phosphoric acid so that the pores or cells become substantially filled with the phosphoric acid and the body is substantially saturated. The phosphoric acid is reacted with phosphoric acid reactive material of the refractory during or after the impregnation treatment. The reaction is effected or expedited and the water is removed by heating the treated body. Particularly desirable results are obtained by heating the treated body to above approximately 500° F. to convert unreacted orthophosphoric acid to pyrophosphoric acid, and to effectuate a reaction of the phosphoric acid, after reaction with any basic material, with silicious material present.

In the preferred embodiment of the invention, a refractory body is used which has a porosity between approximately 5% to 30% by volume and contains a substantial proportion such as 2% by weight or above of basic or alkali refractory material such as the oxides of aluminum, calcium, magnesium and iron. Suitable refractory bodies of this type are fire-clay fire-brick of alumina clay, basic refractory brick, lime bonded fired silica-brick, bonded unfired bricks containing alumina clay, lime, magnesia or the like, and the carbon brick or other bodies containing alumina, iron oxide or like phosphoric acid reactive material. In the case of silica refractories containing basic materials, sufficient phosphoric acid is used so that there is an excess over that required to react with the basic materials.

In order to substantially fill or largely close the interstices between refractory grains (interconnected cells) with phosphate reaction product, it has been found that the air in the cells should be largely removed before impregnating the refractory body with a phosphoric acid.

One method of accomplishing the above result is as follows:

1. Refractory brick are placed in a closed chamber and a vacuum applied (suitably .5" absolute of mercury).

2. Without releasing the vacuum $H_3PO_4$ is introduced into the chamber.

3. The vacuum is released after the brick are submerged in the acid.

4. The brick are allowed to remain submerged in the acid until saturated with the acid and the pores are substantially filled. Preferably air pressure is applied to decrease the time required for saturation and closing of the pores.

5. The acid is removed from the chamber and the brick are drained and dried, preferably at about 500° F.

The following shows a comparison between simple soaking of a brick in phosphoric acid and vacuum impregnation:

TABLE I

| Type of Brick | Percent $H_3PO_4$ pick-up— Soaking 18 hours | Vacuum impregnation—15 Min. |
|---|---|---|
| chemical bonded carbon-clay (Chem-Brix) | 2.5 | 10.6 |
| fire-clay fire-brick | 10.5 | 14.7 |
| lime bonded fired silica-brick | 14.2 | 23.1 |

In the process of this invention the strength of the phosphoric acid used can be varied widely, but in order to largely close the pores in a single impregnation the acid should not contain more than 50% water. 75% to 80% $H_3PO_4$ gives satisfactory results. 100% $H_3PO_4$ gives maximum closure of the pores or cells without the use of a second impregnation. The 100% $H_3PO_4$ is heated to keep it in liquid form. Pyrophosphoric acid $H_4P_2O_7$ and metaphosphoric acid $HPO_3$ may also be used.

The phosphoric acid treatment is preferably applied to a fired brick. For best results the brick should be fired at below the temperature of vitrification. However, the phosphoric acid impregnation process may also be carried out on unfired brick such as dried clay-brick and silica-brick, the firing step being carried out after the impregnation. It is desirable to add a binder to provide ample strength during impregnation. Also the phosphoric acid impregnation process may be carried out on unfired brick and the firing step omitted. In such instances, it is preferred to use a chemically bonded brick such as one made by mixing clay and silica with or without carbon, and sulfuric and phosphoric acids; and then molding the mixture into shape. One brick of this type is sold under the name of Chem-Brix. Basic brick such as magnesite and chrome brick also may be used.

In order to obtain any substantial increase in strength in the refractory body which will maintain its strength under high temperature service conditions, the phosphate impregnation process should be carried out on refractory bodies in which the pores or interstices between the grains or interconnected cells are in the majority of cases below .02″ diameter. It is not only advisable that the pores be filled during the impregnation treatment, but they also should be largely closed, and preferably substantially or entirely filled with reaction product of the phosphoric acid with the material in the body of the refractory. Otherwise there is a volatilization of the phosphoric acid under high temperature service conditions with a consequent weakening of the refractory product. It has been found that refractory bodies composed largely of interconnected cells or open pores and having a uniform porosity of between 5% and 30% give highly satisfactory results. Such refractory bodies have pores mostly below .02″ diameter. Refractory bodies having a porosity of below 5% may be used, such as, for example, 3%, but in such cases the spalling resistance is generally initially low because such bricks are ordinarily formed by high temperature burning which produces some glass formation. At above 30% porosity the volume of the pores is such that the phosphate reaction product does not fill the pore and some uncombined phosphoric acid is volatilized off during service conditions. The strength of such products, however, is still superior to that of untreated products, due to the fact that my impregnation process largely closes the pores with phosphate reaction product even when the pores are too large to be completely closed, but it is not as good as the product having small pores which are substantially filled.

The following examples are given to illustrate this invention:

Example I

Fire-clay fire-brick of kaolinite clay having 18% open pores by volume was placed in a closed container and a vacuum applied to ½″ absolute of mercury which was maintained for 5 minutes without releasing the vacuum. 75% $H_3PO_4$ was introduced in the chamber to completely immerse the brick and then air pressure of 90 p. s. i. was applied for 5 minutes, after which the pressure was released, and acid drained out of the chamber and the excess out of the brick. The brick was then placed in a dryer and heated to 500° F., being brought up to 500° F. over a period of 20 hours, and then heated for 4 hours at 500° F.

The brick after cooling to room temperature was tested and compared with an equivalent brick without the phosphoric acid treatment. Results obtained are as follows:

Modulus of rupture, untreated brick_____p. s. i__ 970
Modulus of rupture, treated brick_____p. s. i__ 1716
Density original brick_____oz. per cu. in__ 1.22
Density treated brick after drying__oz. per cu. in__ 1.32

Percent increase in wt. of original brick by acid pick-up

Before drying_____percent__ 14.4
    After drying_____do____ 7.5
    After heating at 2000° F. for 12 hours__do____ 7.0
Porosity original brick_____do____ 18
Porosity after impregnation and drying_____do____ 6

The dried brick was then given a second treatment the same as the first treatment. There was an additional increase in weight by wet acid pick-up of 4.8% and 2.6% after drying. The porosity of the dried brick was 2% by volume. A third treatment gave no additional pick-up of phosphoric acid.

Example II

Example I was repeated, using 100% $H_3PO_4$ heated to 150° F. The same results were obtained on one treatment as were obtained by two treatments with the 75% phosphoric acid of Example I.

Example III

A lime bonded fired silica-brick, the silica being predominantly cristobalite and containing 3% lime, and having 24% open pores by volume was impregnated and dried in the same manner as set forth in Example I.

Comparative tests were made on the bricks with the following results:

Modulus of rupture of untreated brick_____p. s. i__ 1140
Modulus of rupture of treated brick_____p. s. i__ 2063
Density of untreated brick_____oz. per cu. in__ 1.07
Density of treated brick_____oz. per cu. in__ 1.16
Wet pick-up_____percent by weight__ 18.2
Percent increase of original weight after drying
                                             percent__ 8.6
Percent increase after heating at 2000° F___do____ 8.1
Porosity of untreated brick_____percent by volume__ 24
Porosity of treated brick_____do____ 8

After a second impregnation there was a 7% wet weight increase with a 3½% dry weight increase, the final porosity became 3%.

The original P. C. E. (pyrometric cone equivalent) _____ 31–32
Final P. C. E. after second treatment_____ 32.5

Example IV

The impregnation and drying process of Example I was carried out on a chemically bonded carbon-clay brick sold under the name of Chem-Brix. This brick contained 25% by weight carbon and 75% by weight of alumina clay bonded with $H_3PO_4$ plus $H_2SO_4$.

Comparative tests on the single treated material gave the following results:

Modulus of rupture on the untreated brick__p. s. i__ 800
Modulus of rupture on the treated brick____p. s. i__ 1945
Percent wet pick-up_____percent by weight__ 14.8
Percent dry pick-up_____do____ 7.3
Porosity untreated brick_____percent__ 18
Porosity treated brick_____do____ 6

The bricks used in the above examples were bricks in which the interstices between the grains were almost entirely below .02″ in diameter, and these interstices or intercommunicating cells were almost entirely open or intercommunicating.

The impregnation process is not only useful with refractory bodies containing material which is reactive with phosphoric acid at normal room temperature, but it also is useful with refractory bodies such as a carbon-brick and with a pure silica-brick.

In the process of this invention using refractory brick containing alumina, lime, magnesia and the like, the phosphoric acid is almost entirely converted to a phosphate during the impregnation process and subsequent heating to remove water. However, a small proportion of pyrophosphoric acid, and on heating to elevated temperatures $P_2O_5$, remains in the pores and is not entirely volatilized away during high temperature service conditions since it is trapped in the pores, particularly when some phosphate reaction product is formed, and also may react with the components of the brick at elevated service temperatures to alter the crystal structure and improve spalling characteristics. Also, in the case of silica brick, there is a reaction at elevated temperatures between the phosphoric acid and silica with consequent closing of the pores with silica phosphoric acid reaction product. The reaction of phosphoric acid with silica takes place at about 500° F. to produce water soluble silicon phosphate which at higher temperatures such as are present during service conditions (viz. 2000° F.–3000° F.) become water insoluble.

While I have described certain preferred embodiments of my invention, many modifications thereof may be made without departing from the spirit of the invention; and I do not wish to be limited to the detailed examples, formulae and proportions of ingredients herein set forth, but desire to avail myself of all changes within the scope of the appended claims.

I claim:

1. The method of producing a dense refractory body which comprises subjecting a clay fire-brick having between approximately 5% to 30% pores the majority of which are below .02 of an inch in diameter to a vacuum to evacuate air from said pores, immersing said brick in a hot, fluid phosphoric acid substantially free of water and applying pressure against said phosphoric acid to force phosphoric acid into the pores of the brick and substantially fill the majority of said pores and substantially saturate said body, draining excess acid from the brick, and heating said brick to above about 500° F.

2. The method of producing a dense refractory body which comprises subjecting a porous silica-brick containing a minor proportion of lime and having between approximately 5% to 30% pores the majority of which are below .02 of an inch in diameter to a vacuum to evacuate air from said pores, immersing said brick in a hot, fluid phosphoric acid and applying pressure against said phosphoric acid substantially free of water to force phosphoric acid into the pores of the brick and substantially fill the majority of said pores and substantially saturate said body, draining excess acid from the brick, and heating said brick to above about 500° F.

3. The method of producing a dense refractory body of high resistance to thermal shock which comprises subjecting a phosphoric acid reactive refractory brick having between approximately 5% to 30% pores the majority of which are below .02 of an inch in diameter to a vacuum to evacuate air from said pores, immersing said brick in a hot, fluid phosphoric acid substantially free of water and applying pressure against said phosphoric acid to force phosphoric acid into the pores of the brick and substantially fill the majority of said pores and substantially saturate said body, draining excess acid from the brick, and heating said brick to above about 500° F.

References Cited in the file of this patent

UNITED STATES PATENTS

| | | |
|---|---|---|
| 796,253 | Ryan | Aug. 1, 1905 |
| 1,628,910 | Prouty et al. | May 17, 1927 |
| 2,138,870 | Lower | Dec. 6, 1938 |
| 2,232,462 | Lower | Feb. 18, 1941 |
| 2,325,553 | Schleicher et al. | July 27, 1943 |
| 2,699,404 | Ramadanoff | Jan. 11, 1955 |

FOREIGN PATENTS

| | | |
|---|---|---|
| 1,492 | Great Britain | 1863 |